March 4, 1941.  J. DULOVITS  2,233,591
SOFT EFFECT SCREEN LENS
Filed Sept. 17, 1938
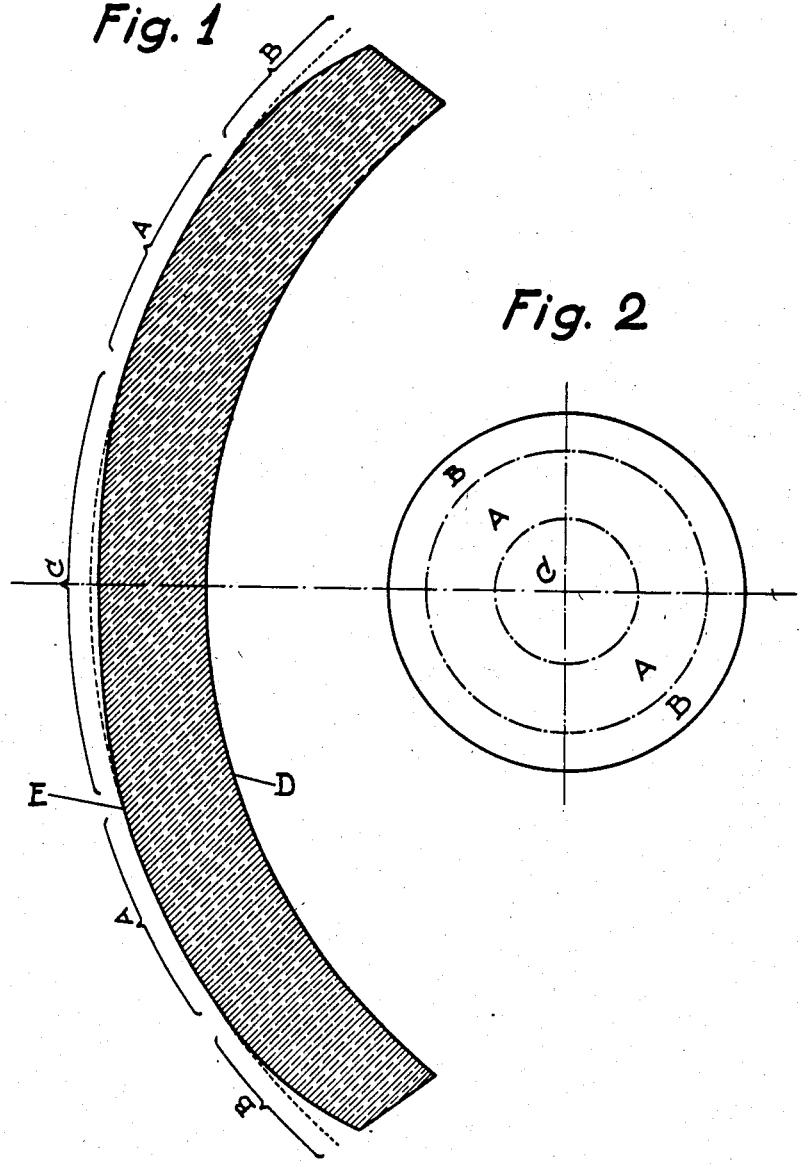
Inventor
Jenő Dulovits
by [signature]
his Attorney.

Patented Mar. 4, 1941

2,233,591

UNITED STATES PATENT OFFICE 2,233,591

SOFT EFFECT SCREEN LENS

Jenö Dulovits, Budapest, Hungary

Application September 17, 1938, Serial No. 230,420
In Germany September 24, 1937

3 Claims. (Cl. 88—57)

This invention relates to "soft" effect screen lenses which are set before an objective to "soften" the otherwise sharp image produced by the objective.

Known soft effect screen lenses have on their surface indentations, grooves or projections which distort the image on the peripheral portions of its field. They produce also annoying mirage effects whenever direct or even reflected light falls on them.

The chief object of this invention is to provide a soft effect screen lens which has a smooth surface and is thus free from the disadvantages mentioned, although at the same time possessing all the advantages of the lenses in question.

Another object of the invention is to provide a lens which when placed in front of any corrected photograph object glass (anastigmatic) makes the otherwise disagreeably sharp picture 'soft" and at the same time considerably increases the sharpness of such parts of the image as form the foreground and background. The intensity of light remains unaffected.

My soft effect screen lens has a meniscus form with smooth front and back faces, one of which is spherical so as to have uniform curvature throughout its area, while the other face comprises three axially concentric zones of different curvatures, viz.—a spherical intermediate zone which is concentric to the opposite spherical face so as to determine an infinite focal length, and two aspheric zones, respectively situated outwardly and inwardly of said intermediate zone, and being the one less, and the other more, sharply curved than said intermediate spherical zone, the longest radius of curvature for said less sharply curved zone being from one-half to six per cent. longer, and the shortest radius of curvature for said more sharply curved zone being from one-half to seven per cent. shorter, than the radius of curvature of said spherical intermediate zone.

An embodiment of the invention is shown by way of example in the accompanying drawing in which Fig. 1 is a greatly enlarged cross-section, and Fig. 2 is a less enlarged front view of a screen lens in accordance with the invention.

The lens as shown has a meniscus form and one of its surfaces, which is the back surface D or the surface lying nearer the objective in the embodiment shown in the drawing, is spherical, while the other surface E consists of three concentric zones A, B, C of different curvatures, the peripheral zone B being more, and the central zone C less, curved than the intermediate zone A, or the zone comprised between the peripheral zone B and the central zone C, which intermediate zone A in spherical and concentric to the back surface D. In Fig. 1, the spherical intermediate zone is continued in dotted lines both inwards and outwards to make the divergence of the central and peripheral zones from the spherical surface more visible. In Fig. 2, the adjacent zones are separated by dots-and-dashes from one another.

The zone B having a greater curvature acts as a series of converging lenses (because of its varying curvature); the zone C having the lesser curvature acts as a series of dispersing lenses; finally, the spherical zone A being concentric to the back surface D optically acts similarly to a plano-parallel plate of glass. Seemingly minute divergences of the central and peripheral zones, designated by C and D, respectively, from the spherical zone A suffice to provoke the desired result. Taking the radius for the spherical intermediate zone A as equal to $r$, the longest radius of curvature in the central zone C may vary, in the different embodiments of the invention, from $1.005\ r$ as the lower limit to $1.06\ r$ as the upper limit, and the shortest radius of curvature in the peripheral zone B may vary from $0.995\ r$ as the upper limit to $0.93\ r$ as the lower limit. Of course, the divergences of the central and peripheral zones from the intermediate zone progressively decrease towards the intermediate zone, as shown in Fig. 1, of the drawing.

The explanation of the softening effect of this lens is to be sought in the circumstance that the intermediate zone A does not alter the focal length of the corrected photographic objective before which the soft effect screen lens is situated so that the rays of light passing through zone A would by themselves produce a sharp image in a definite plane which is the normal picture plane. But the rays passing through zone B converge in front of, and the rays passing through zone C converge behind, this plane so that these rays produce on the picture plane diffused spots only which form a halo radiance around the otherwise sharp lines of the photograph. It follows from the same reason that subjects in the foreground and subjects in the background are reproduced sharp by the rays passing through the zone B and the zone C, respectively, so that the depth-sharpness of the picture is considerably increased.

My screen lens gives perfectly soft pictures and is free from all the disadvantages of other soft effect screen lenses. Having no indentations, grooves or projections, it does not produce those annoying mirage effects which so far have inevitably appeared in the case of other soft effect screen lenses when sharp direct or even reflected light fell upon them. Owing to its curved cross-section, it does not produce any distortions at the peripheral portions of the picture field which appear in the case of other screen lenses, more especially when being screened off.

Apart from this, novel effects can be obtained by means of screen lenses made in accordance with the invention. As the curvatures of the aspherical zones B and C may be so shaped as to diverge very slightly from that of the spherical zone A, the width of the halo radiance produced by the aspherical zones may be so reduced that it will not exceed the average dimension of the grains of the negative. When a lens so shaped is combined with the objective of an enlarging camera, the grains will be blurred, while the outlines will hardly appreciably change and no fog will appear at the "light spots." With soft effect screen lenses of another type, the production of a light border of very small width and of any intensity desired will meet so to speak invincible obstacles, and a more or less dense fog will be set up. This fog will the more appear on the enlarged photograph as a very strong developer is used for purposes of enlargement.

The shapes of the surfaces D and E may be interchanged i. e. the front surface may be made spherical and the back surface aspherical without departing from the essence of the invention. Also the shapes of the zones B and C may be interchanged i. e. the peripheral zone may have lesser, and the central zone greater, curvature than the intermediate spherical zone A. With a lens so modified, a sharper picture of the foreground will be obtained by means of the rays passing through the central zone and a sharper picture of the background by means of the rays passing through the peripheral zone.

I am aware of a meniscus lens with smooth front and back faces, one of which is spherical, and the other is divided into axially concentric zones of different curvatures, but this known lens differs from my soft effect screen lens in that no part of the non-uniformly curved face is concentric to the uniformly curved face, and in lack of such a concentric part, the lens is not adapted for the purposes of the present invention.

What I claim is:

1. A soft effect screen lens having a meniscus form with smooth front and back faces, one of which is substantially spherical so as to have a substantially uniform curvature throughout its area, while the other face comprises three axially concentric zones of different curvatures, viz.—a spherical intermediate zone which is concentric to the opposite spherical face so as to determine an infinite focal length, an aspheric zone situated outwardly, and another aspheric zone situated inwardly of said intermediate zone, one of said aspheric zones being less sharply curved than said spherical intermediate zone and having a longest radius of curvature from one-half to six per cent. longer than the radius of said spherical intermediate zone, and the other of said aspheric zones being more sharply curved than said spherical intermediate zone and having a shortest radius of curvature from one-half to seven per cent. shorter than the radius of said spherical intermediate zone.

2. A soft effect screen lens having a meniscus form with smooth front and back faces, one of which is spherical so as to have uniform curvature throughout its area, while the other face consists of a central circular, a peripheral annular, and an intermediate annular zone, which intermediate zone is spherical and concentric to the opposite spherical face of uniform curvature so as to determine an infinite focal length, while said central and peripheral zones are both aspherical and the one is less, and the other more, sharply curved than said intermediate spherical zone, the longest radius of curvature for said less sharply curved zone being from one-half to six per cent. longer, and the shortest radius of curvature for said more sharply curved zone being from one-half to seven per cent. shorter, than the radius of said spherical intermediate zone, and the divergences of said aspheric zones from said spherical zone progressively decreasing towards said spherical intermediate zone.

3. A soft effect screen lens as claimed in claim 2, wherein the less sharply curved aspheric zone occupies a central, and the more sharply curved aspheric zone, a peripheral position.

JENÖ DULOVITS.